United States Patent [19]

Greeley

[11] Patent Number: 4,807,710

[45] Date of Patent: Feb. 28, 1989

[54] EARTH AUGER FOR PLANTING BULBS

[76] Inventor: William Greeley, 55 Curtis Pl., Maplewood, N.J. 07040

[21] Appl. No.: 23,244

[22] Filed: Mar. 9, 1987

[51] Int. Cl.$^4$ .............................................. A01C 5/02
[52] U.S. Cl. ....................................... 175/394; 111/4; 172/25; 172/111; 175/84; 294/50.6
[58] Field of Search ................... 294/50.6; 172/25, 41, 172/22; 175/594, 406, 323, 84; 111/4, 2, 89, 92, 99

[56] References Cited

U.S. PATENT DOCUMENTS

| | | | |
|---|---|---|---|
| 2,887,300 | 5/1959 | Meredith | 175/394 |
| 2,890,860 | 6/1959 | Smith | 175/394 X |
| 3,356,168 | 12/1967 | Johnson | 175/394 |
| 3,444,940 | 5/1969 | Thomas | 175/394 |
| 4,282,943 | 8/1981 | Leitner | 175/394 |
| 4,364,441 | 12/1982 | Geeting | 175/84 |

FOREIGN PATENT DOCUMENTS 272763  3/1951  Switzerland .......................... 172/25

Primary Examiner—Richard J. Johnson
Attorney, Agent, or Firm—Kenyon & Kenyon

[57] ABSTRACT

The earth auger is provided with a clearing blade near the top of the flight for clearing loose soil from about the mouth of the drilled hole. A second blade is provided at the distal end of the auger within the contour of the flight for cutting of fibrous roots and to loosen the soil to encourage plant root growth.

19 Claims, 1 Drawing Sheet

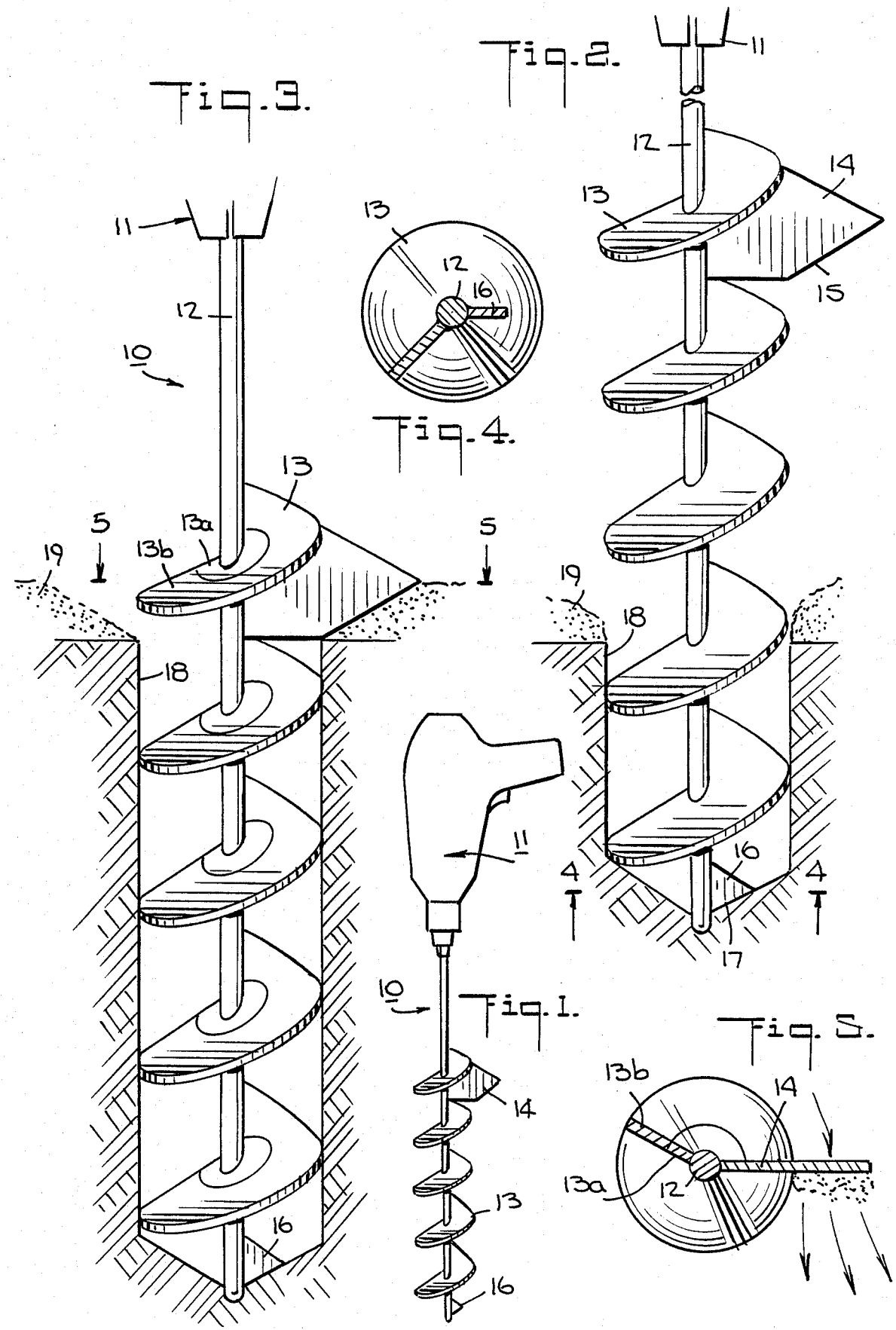

EARTH AUGER FOR PLANTING BULBS

This invention relates to an earth auger. More particularly, this invention relates to an earth auger for planting bulbs.

Heretofore, various types of gardening tools have been known for the planting of bulbs such as tulip bulbs, daffodil bulbs and the like. Generally, these bulbs require planting at predetermined depths, such as three inches, six inches, and nine inches depeneding upon the type of bulb. Accordingly, the gardening tools have frequently been provided with reference marks in order to determine the depth of a hole may be such a tool.

Frequently, the gardening tools for the planting of bulbs have been of the type which require manual exertion for example as described in U.S. Pat. Nos. 2,149,880 and 2,865,315. However, with such tools, the planting of many bulbs can become a tedious time-consuming and arduous task.

It has also been known to provide power driven augers for drilling holes in the earth, for example as described in U.S. Pats. Nos. 3,356,168 and 3,695,193. It is also known that when drilling a hole in the earth, there is a build up of soil and debris around the edge of the hole during the drilling operation. After drilling, a portion of this soil can fall back into the hole, in which case, further labor is required in order to effect removal of this soil. In order to address this problem, various types of cleaning devices have been proposed for use with earth drilling augers in order to move a loose soil build up away from a drilled hole, for example as described in U.S. Pat. No. 4,364,441. However, such devices have usually been relatively cumbersome and require attachment to the auger. Still further, the known devices generally extend a substantial radial distance from the auger so that there is a risk that the user may become injured by a rotating device.

Accordingly, it is an object of the invention to provide a relatively simple earth auger for drilling clean holes in the ground.

It is another object of the invention to be able to drill a multiplicity of clean holes in the ground in a simple efficient manner.

It is another object of the invention to be able to drill a multiplicity of holes in the ground for planting of bulbs in a simple manner.

It is another object of the invention to provide an earth auger of relatively simple construction with an integrated clearing device.

Briefly, the invention provides an earth auger which is comprised of a shaft, a screw which extends about a shaft to a distal end for forming a hole in the ground and a blade which extends radially from the shaft at a predetermined distance from the distal end. In addition, the blade extends radially outwardly of the screw for clearing soil from about the mouth of a hole drilled in the ground.

The auger is constructed so that the screw has an outside diameter which is suitable for drilling holes of a size to permit planting of bulbs such as tulip bulbs, daffodil bulbs and the like. For example, the screw is made with an outside diameter of from about 1 inch to about 3 inches. For example, for tulip bulbs, the outside diameter of the flight is about 2½ inches.

The shaft of the auger is of relatively small size so to fit into a power drill or the like as well as to reduce overall bulk and weight of the auger. For example, the shaft is made with a diameter of 5/16 inch. Further, the shaft is made of a suitable length so as to permit a user to drill a multiplicity of holes in the ground from a comfortable position. For example, the shaft may be of a length of from 20 inches to 24 inches.

The blade is shaped to clear the soil which is lifted by the screw during drilling from about the mouth of the hole after the hole has been drilled to the predetermined depth. To this end, the blade is shaped to provide an angularly disposed edge which extends beyond the screw for clearing of the mound of soil from about a drilled hole. For example, the blade may be provided with a triangular shaped end which extends beyond the screw. Alternatively, the blade may be sized to fit between the flights of the screw at the upper end of the auger.

The earth auger is of relatively simple construction and can be made in any suitable manner. For example, the blade for clearing the soil can be welded to the shaft or otherwise connected. Likewise, the screw can be fixed to the shaft in any suitable manner.

In the event that a relatively thin shaft is used with a screw of relatively large diameter, the screw can be a composite screw made of a pair of coextensive spiral sections.

The earth auger also has a means on the distal end of the shaft having a cutting edge for cutting small roots such as fibrous roots. For example, the means may be in the form of a blade of triangular shape which extends radially of the shaft and radially within the flight. This second blade serves to cut small fibrous roots in the ground which may impede drilling of a hole by the auger. In addition, this blade by extending below the screw serves to loosen the soil within a recess below a drilled hole in order to enhance bulb root growth.

These and other objects and advantages of the invention will become more apparent from the following detailed description taken in accompanying with the drawings wherein:

FIG. 1 illustrates a view of an earth auger constructed in accordance with the invention as driven by an electric drill;

FIG. 2 illustrates a broken view of an earth auger during drilling of a hole in the ground in accordance with the invention;

FIG. 3 illustrates a view of an earth auger with a composite screw at the time a hole is completely drilled;

FIG. 4 illustrates a view taken on line IV—IV of FIG. 2; and

FIG. 5 illustrates a view taken on line V—V of FIG. 3.

Referring to FIG. 1, the earth auger 10 is sized to be driven, for example by a power drill of conventional construction, for example a portable (i.e. hand held) electric drill 11. To this end, the auger 10 has a shaft 12 which is sized to fit into the power drill 11, for example, the shaft has a a diameter of 5/16 inch. In addition, the shaft 12 is of a length to permit a user to comfortably handle the auger 10 and drill 11 from a standing position. For example, the shaft may be of a length of from 20 inches to 24 inches.

Referring to FIG. 2, the auger 10 also has a screw 13 which extends helically about the shaft 12 from a point spaced from a distal end of the shaft 12 for drilling holes in the ground upon rotation of the shaft 12. For example, for the planting of tulip bulbs, the screw 13 has an outside diameter of about 2½ inches, a thickness of 0.105 inches and may be welded or otherwise secured to the shaft 12. In this example, the flights of the screw 13 are spaced apart on a centerline-to-centerline distance of 2 inches.

It has been found that the use of a relatively thin shaft 12 limits the size of a screw 13 which can be integrally formed therewith. This is due to the constraints imposed by the bending of a strip of steel into a spiral. For example, for a shaft of about 5/16 inch diameter, a screw with an outer diameter of about 1¾ inches is a maximum. However, the outer diameter can be increased by using a composite screw, for example, formed of a pair of coextensive spiral sections.

Referring to FIG. 3 wherein like reference characters indicate like parts as above, the auger 10 is provided with a composite screw 13 having an inner spiral section 13a secured to and about the shaft 12 and an outer spiral section 13b secured to the inner spiral section 13a. In this embodiment, the shaft 12 has a diameter of 5/16 inch, the inner spiral section 13a has an outside diameter of 13/16 inch and the outer spiral section has an outside diameter of 2 7/16 inches with flights disposed in a centerline-to-centerline spacing of 2 inches. The two sections 13a, 13b of the screw 13 can be integrally secured together, for example by welding at spaced points. Further, a small gap may exist between the two sections if necessary for manufacturing purposes without impairing the use of the auger 10.

The auger 10 also has a blade 14 extending radially from the shaft 12 at a predetermined distance from the distal end of the shaft 12 and intermediately of the screw 13 at the proximal end of the screw 13. The blade 14 is made of flat planar construction and has a thickness, for example of ⅛ inch and extends outwardly of the screw 13. For example, the blade 14 projects from the centerline of the shaft 12 to a distance of 2¼ inches. In addition, the blade is shaped in order to clear soil from about the mouth of the hole drilled in the ground to a depth equal to the distance of the blade 14 from the distal end of the auger 10. For example, the blade 14 has a triangular shape end which extends beyond the screw 13 and on which an angularly disposed edge 15 is provided. This edge 15 may be disposed at an angle of about 45° to a horizontal plane.

The blade 14 may be positioned intermediately of the flights of the screw 13 or at the proximal end of the screw 13 to permit a hole to be drilled to a depth equal to or substantially equal to the distance of the blade 14 from the tip of the shaft 12, that is to permit the flights of the screw 13 to lift soil from the hole.

The blade 14 may be covered with suitable protective material such as rubber or plastic in order to cover over any sharp edges and to reduce the risk of injury. Further, the outer portions of the blade may be made of suitable materials to reduce the risk of injury to a user. Still further, the blade 14 may be apertured to reduce weight and/or to achieve better balance.

The auger 10 also has a means in the form of a blade 16 of triangular shape on the distal end of the shaft 12 which extends radially of the shaft 12 radially within the screw 13. As illustrated, this blade 16 has a cutting edge 17 on the lower end for cutting small roots such as fibrous roots. Further, since the blade 16 extends from a flightless part of the shaft 13, the soil loosened by the blade 16 is not lifted by the screw 13 but rather remains within a recess below the drilled hole to enhance growth of the roots of a subsequently deposited bulb. The lower blade 16 is also disposed on the shaft 12 opposite to the upper blade 14 for purposes of balance.

Referring to FIGS. 2 and 3, in order to plant a tulip bulb, the earth auger 10 is fitted into the power drill 11 and is rotated in order to form a hole 18 in the ground. At this time, the blade 16 at the distal end of the shaft 12 cuts any small roots which may come into contact with the auger while the screw 13 conveys the soil upwardly to form the hole 18. During the drilling of the hole 18, loose soil 19 accumulates about the mouth of the hole. Upon completion of the hole 18, the blade 14 at the proximal end of the screw 13 serves to push and blow the soil away from the mouth of the hole 18.

When the auger 10 is removed from the hole 18, the loose soil 19 about the mouth of the hole is in a mounded state so that the soil cannot flow back into the hole 18.

Referring to FIGS. 2 and 4, the blade 16 at the distal end is sized so as to fit within the outer contour of the screw 13 and, thus, not interfere with the drilling of a hole 18 to the diameter of the flight 13.

Referring to FIGS. 3 and 5, the upper blade 14 is sized to extend a sufficient distance beyond the screw 13 so that the loose soil 19 about a drilled hole 18 can be conveniently cleared without stirring up a large amount of soil. Further, the blade 14 is of relatively small size so as not to interfere with the operation of the auger 10 to reduce any risk to the user due to flying objects. In this respect, the amount of soil cleared from about a drilled hole 18 is sufficient to prevent the loose soil from falling back into the hole 18 while at the same time providing a clear entrance for manually dropping a bulb into the hole 18. The size of the blade 14 is relatively small and, thus, can be welded or otherwise made integral with the shaft 12 as well as the screw 13, if desired, to form a compact integrated unit.

The length of the screw 13 along the shaft 12 and the placement of the clearing blade 14 are adapted to the type of bulb being planted. For example, for a tulip bulb which is to be planted at a 6 inch depth, the screw 13 is spaced two inches from the distal end of the shaft 12 and the blade 14 is spaced eight inches from the distal end of the shaft 12. Thus, when the auger 10 is removed from a drilled hole, the hole itself has a depth of 6 inches while the mound of loose soil 19 about the mouth of the hole 8 is shaped to preclude loose soil from falling back into the hole.

When the auger 10 is connected to the power drill 11, a multiplicity of holes can be drilled in the ground for receiving bulbs in a rapid efficient manner. Further, since the holes are formed without loose soil falling back into the holes, there is no need to re-drill a hole in order to remove soil which may have fallen back into the hole.

The invention thus provides an earth auger of relatively simple construction which can be readily manufactured as a one-piece unit.

The invention further provides an earth auger which is able to drill holes of predetermined depth into the ground without loose soil falling back into the holes upon completion of drilling.

The invention also provides an earth auger which can be adapted for use with any suitably sized power drill for the rapid and efficient planting of bulbs.

What is claimed is:

1. A one piece earth auger comprising
a shaft sized to fit a portable hand held drill;
an integrally secured screw extending helically about said shaft; and an integrally secured flat planar blade extending radially from said shaft at a predetermined planting distance from a distal end of said shaft, said blade being disposed at a proximal end of said screw and extending radially outwardly beyond said screw for clearing soil from about a hole drilled in the ground for planting a bulb therein.

2. An earth auger as set forth in claim 1 wherein said shaft has a diameter of 5/16 inch.

3. An earth auger as set forth in claim 2 wherein said screw is a composite screw having an inner spiral section secured to and about said shaft with a diameter of 13/16 inches and an outer spiral section secured to said inner spiral section.

4. An earth auger as set forth in claim 3 wherein said screw has an outside diameter of 2¼ inches.

5. An earth auger as set forth in claim 4 wherein said blade has a triangular shaped end extending beyond said screw.

6. An earth auger as set forth in claim 1 wherein said blade has an angularly disposed edge extending beyond said screw.

7. An earth auger as set forth in claim 1 which further comprises a second blade extending radially from said distal end of said shaft and radially within said screw, said second blade having at least one edge thereon for loosening soil within a recess below a drilled hole in the ground.

8. An earth auger as set forth in claim 7 wherein each blade is of a thickness of ⅛ inches.

9. A one piece earth auger for planting bulbs in the ground, said auger comprising
a shaft sized to fit a portable hand held drill;
an integrally secured screw extending about said shaft to a distal end for drilling a hole in the ground upon rotation of said shaft; and
an integrally secured flat planar blade extending radially from said shaft at a predetermined planting distance from said distal end, said blade extending radially outwardly beyond said screw for clearing soil from about the mouth of the hole drilled in the ground to a depth equal to said predetermined distance for planting a bulb therein.

10. An earth auger as set forth in claim 9 wherein said screw has an outside diameter of from 1 inch to 2½ inch.

11. An earth auger as set forth in claim 9 wherein said blade has an angularly disposed lower edge extending beyond said screw.

12. An earth auger as set forth in claim 11 wherein said blade has a triangular shaped end projecting beyond said screw.

13. An earth auger as set forth in claim 9 wherein said blade is of a thickness of ⅛ inch.

14. An earth auger as set forth in claim 9 wherein said shaft has a diameter of 5/16 inch.

15. An earth auger as set forth in claim 14 wherein said screw is a composite screw having an inner spiral section secured to and about said shaft and an outer spiral section secured to said inner spiral section.

16. An earth auger as set forth in claim 9 which further comprises means on said distal end of said shaft having a cutting edge for cutting fibrous roots.

17. An earth auger comprising
a shaft having a diameter of 5/16 inch; and
a composite screw extending helically about said shaft, said screw having an inner spiral section secured to and about said shaft and a separate outer spiral section welded at spaced points to said inner spiral section.

18. An earth auger as set forth in claim 17 wherein said inner spiral section has an outside diameter of 13/16 inch and said outer spiral section has an outside diameter of 2 7/16 inches and fights disposed on a centerline-to-centerline spacing of 2 inches.

19. An earth auger for planting bulbs in the ground, said auger comprising
a shaft;
a screw extending about said shaft to a distal end for drilling a hole in the ground upon rotation of said shaft;
a blade extending radially from said shaft at a predetermined planting distance from said distal end, said blade extending radially outwardly of said screw for clearing soil from about the mouth of the hole drilled in the ground to a depth equal to said predetermined distance; and
a blade of triangular shape on said distal end of said shaft having a cutting edge for cutting fibrous roots and extending radially of said shaft and radially within said screw.

* * * * *

UNITED STATES PATENT AND TRADEMARK OFFICE
CERTIFICATE OF CORRECTION

PATENT NO. : 4,807,710
DATED : Feb. 28, 1989
INVENTOR(S) : WILLIAM GREELEY

It is certified that error appears in the above-identified patent and that said Letters Patent is hereby corrected as shown below:

Column 1, line 11 change "depeneding" to -depending-
　Line 14 change "may be" to read -- made by --.

Signed and Sealed this

Fifteenth Day of August, 1989

Attest:

Attesting Officer

DONALD J. QUIGG

Commissioner of Patents and Trademarks